United States Patent
Kadota

(10) Patent No.: US 7,612,899 B2
(45) Date of Patent: Nov. 3, 2009

(54) PRINT DATA PROCESSING SYSTEM

(75) Inventor: Masatoshi Kadota, Takahama (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1031 days.

(21) Appl. No.: 10/935,198

(22) Filed: Sep. 8, 2004

(65) Prior Publication Data

US 2005/0052693 A1  Mar. 10, 2005

(30) Foreign Application Priority Data

Sep. 8, 2003  (JP)  ............................... 2003-315657

(51) Int. Cl.
*G06F 15/00* (2006.01)
(52) U.S. Cl. ..................................... 358/1.13; 358/1.15
(58) Field of Classification Search .................. 358/1.13, 358/1.15, 2.1, 3.24; 347/5
See application file for complete search history.

(56) References Cited

U.S. PATENT DOCUMENTS

| 6,433,882 B1 | 8/2002 | Mori et al. |
| 7,199,890 B2 | 4/2007 | Kawamoto |
| 2001/0052038 A1* | 12/2001 | Fallon et al. .................. 710/68 |
| 2002/0089691 A1* | 7/2002 | Fertlitsch et al. ............ 358/1.15 |
| 2002/0101600 A1* | 8/2002 | Sabbagh et al. ............. 358/1.13 |
| 2002/0175958 A1* | 11/2002 | Natori ........................... 347/5 |
| 2003/0076519 A1 | 4/2003 | Kadota |
| 2003/0103221 A1* | 6/2003 | Natori ........................ 358/1.9 |
| 2004/0190067 A1* | 9/2004 | Owen ......................... 358/2.1 |

FOREIGN PATENT DOCUMENTS

| JP | A-10-232749 | 9/1998 |
| JP | A 11-219265 | 8/1999 |
| JP | A-11-327856 | 11/1999 |
| JP | A-2001-43052 | 2/2001 |
| JP | A 2001-109599 | 4/2001 |
| JP | A-2002-133429 | 5/2002 |
| JP | A 2003-131836 | 5/2003 |

* cited by examiner

*Primary Examiner*—King Y Poon
*Assistant Examiner*—Allen H Nguyen
(74) *Attorney, Agent, or Firm*—Oliff & Berridge, PLC

(57) ABSTRACT

When sending a print data to a server over a network to print the print data using a printer connected to the server, first the client opens the printer in a RAW mode. Next, the client specifies one of print processors providing to the server that is only for RAW data. Then, the client 1 performs job process on the print data and sends RAW data to the server 2. Thereafter, the client 1 closes the printer. As a result, the amount of print data sent from the client to the server is reduced.

7 Claims, 10 Drawing Sheets

PRINT DATA PROCESSING SYSTEM

BACKGROUND OF THE INVENTION

1. Field of the Invention

The present invention relates to a network system in which an image forming device connected to a server performs printing upon receiving print data from a client computer over a network, and more specifically to a print data processing system provided to the client computer.

2. Related Art

There have been known network printing systems in which an image forming device is connected to one of a plurality of personal computers (PCs) interconnected over a network so that the image forming device is available to all PCs connected to the network. The image forming device could be a printer, a multifunctional device having a printer function, or the like.

The present applicant has suggested in Japanese Unexamined Patent Application Publication No. 2003-131836 a network printing system with Windows (registered trademark), which is an example of operating system (OS), installed in client computers and also in a server.

Windows (registered trademark) provides Graphics Device Interface (GDI), which is a program module for representing graphical object. When a user designates to print document on application software, print data is prepared through the GDI. That is, the application sends draw commands to the GDI by calling functions for drawing functions of the GDI. The application therefore does not need to know the model and specifications of the image forming device used for printing, and the application can print to image forming devices in a variety of models with varying specifications by simply using the GDI. In the technology disclosed in Japanese Unexamined Patent Application Publication No. 2003-131836 also, application software running on a client computer sends a print command to the GDI to generate print data to be sent to a server.

In the technology disclosed in Japanese Unexamined Patent Application Publication No. 2003-131836, when the application software sends a print command to the GDI to generate print data to be sent to the server, the GDI generates the print data in a format called an Enhanced Meta File (EMF). Print data in the EMF format is independent form a type of device, that is, not dependent on the model of the image forming device, and is thus more versatile than print data written in a device-dependent format enabling recognition by the specific final printer doing the actual printing (hereinafter referred to as "RAW data"). The EMF format makes it simple to process data and to create data.

Also, in this technology, the client computer creates data in the EMF format and then sends the same to the server. The server temporarily stores the received data in the EMF format as a spool file, and processes the spool file and/or extracts font data from the spool file as needed. Then, the server converts the data in the EMF format to RAW data recognizable by the image forming device and sends the RAW data to the image forming device for printing on paper or other recording medium.

However, sending data in the EMF format from the client computer to the server sometimes increases the amount of data that flows over the network to a large degree. This places a heavy burden on the network.

Because data in the EMF format is independent of the type of a target device, the data in the EMF format often contains much extra data that is not needed by the target device.

For example, data in the EMF format might contain color information even though a monochrome image forming device will be used for printing, or the print data might be high resolution print data even though a low resolution image forming device will be used for printing. In these cases, information that cannot be used effectively by the image forming device flows over the network, thereby placing unnecessary burdens on the network.

Also, data in the EMF format might contain redundant information to facilitate secondary processing. For example, in multipage printing called N-in-1 printing, such as 2-in-1 or 4-in-1 printing, N-number of successive pages is printed on a single sheet. However, in the EMF format, print data for the N-number of successive pages is not reduced to data for a single page (sheet). Instead, corresponding data includes print data for the N-number of successive pages and a command data for converting the print data to the N-in-1 format.

In addition, when printing a text, such as CONFIDENTIAL, over an original image, the text and the original image are superimposed one on the other and printed on a single sheet. However, data in the EMF format includes data for the text as a separate layer from data for the original image, but the data for the text and the data for the original image are not processed into print data for a single page.

This is convenient to further process the print data, such as to convert a 2-in-1 layout to a 4-in-1 layout, or to change the color of the text. However, this simply puts an unnecessary load on the network if further processing is unnecessary.

SUMMARY OF THE INVENTION

In the view of foregoing, it is an object of the present invention to overcome the above problems, and also to provide a print data processing system that reduces the amount of print data sent from a client computer to a server, thereby reducing the load on a network.

In order to attain the above and other object, according to one aspect of the present invention, there is provided a print data processing system provided to a client device of a printing system that transmits a print data from the client device to a server over a network, the server being connected to an image forming device. The print data processing system includes a GDI, a spooler, and processing means. The GDI generates a print data according to a draw command in selected one of a first format and a second format. The print data in the first format is an intermediate data convertible to a data dependent of the image forming device. The print data in the second format is dependent of the image forming device and compressed more than the print data in the first format. The GDI selectively generates a primary print data in the first format that includes image data and process information indicating how to process the image data. The spooler stores the print data generated by the GDI as a spool file and is capable of sending the print data stored as the spool file to the server over the network. The processing means is for generating the draw command corresponding to a processed image based on the image data and the process information included in the primary print data in the first format and for applying the draw command to the GDI. The GDI generates a secondary print data in the second format that includes information corresponding to the processed image upon applied with the draw command. The GDI generates the primary print data in the first format in accordance with a command from a higher module. The spooler stores the primary print data in the first format as a spool file. The processing means generates the draw command corresponding to the processed image based on the primary print data in the first format and applies the draw command to the GDI. The GDI generates the secondary print data in the second format in accordance with the draw command. The spooler stores the secondary print data in the second format as a spool file and transmits the secondary print data in the second format to the server over the network.

According to different aspect of the present invention, there is provided A control program for controlling a print data processing system provided to a client device of a printing system that transmits a print data from the client device to a server over a network, the server being connected to an image forming device. The control program includes the programs of a) generating a primary print data in a first format in accordance with a command from a higher module using a GDI, the primary data including image data and process information indicating how to process the image data, b) storing the primary print data in the first format as a spool file, c) generating a draw command corresponding to a processed image based on the image data and the process information included in the primary print data in the first format, d) applying the draw command to the GDI, e) generating a secondary print data in a second format in accordance with the draw command using the GDI, the secondary print data in the second format including information corresponding to the processed image, and f) storing the secondary print data in the second format as a spool file and transmitting the secondary print data in the second format to the server over the network. Data in the first format is an intermediate data convertible to a data dependent of the image forming device, and data in the second format is dependent of the image forming device and compressed more than the data in the first format.

PREFERRED EMBODIMENT OF THE PRESENT INVENTION

Next, a print data processing system according to an embodiment of the present invention will be described with reference to the accompanying drawings.

Figure 1:
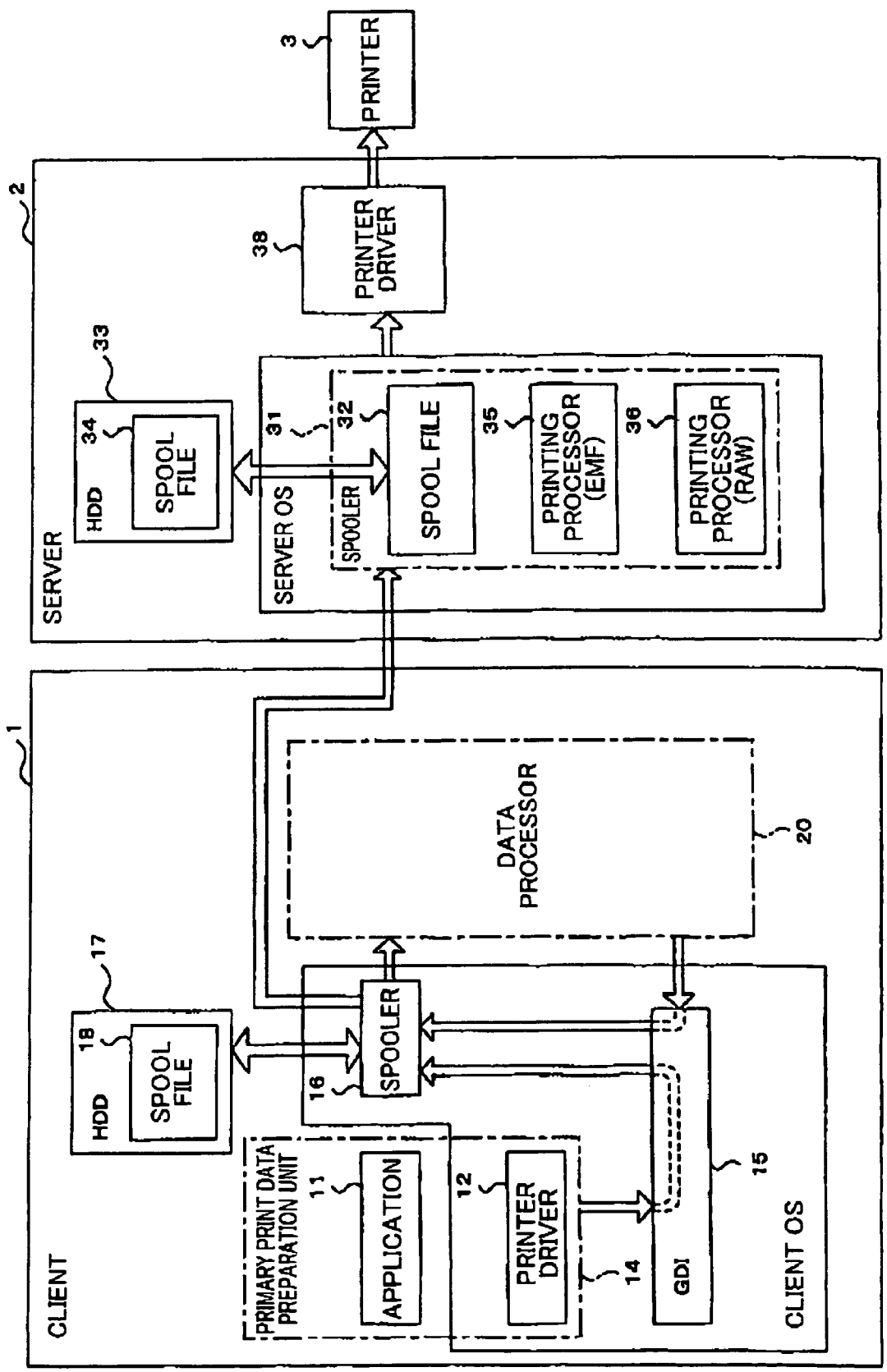
FIG. 1 is a bock diagram showing the configuration of a print system according to an embodiment of the present invention.

FIG. 1 is a block diagram showing the configuration of a print system 100. The print system 100 includes a client computer 1, a server computer 2, and a printer 3. In the following description, the client computer 1 and the server computer 2 will be referred to as "client 1" and "server 2", respectively. The client 1 includes the print data processing system of the present embodiment.

The client 1 and the server 2 are both personal computers and each includes a control unit, an input unit, an output unit, such as a display, and a storage well known in the art. The control unit includes a central processing unit (CPU), a read only memory (ROM), and a random access memory (RAM), and the input unit includes a keyboard and a pointing device. An example of the storage is a hard disk drive. Windows (registered trademark) is installed as the operating system (OS) on both the client 1 and the server 2. Common basic functions used by all applications, such as disk and memory management and input/output functions including keyboard input and screen output, are handled by the OS. It should be noted that in the following description, it is assumed that the client 1 and the server 2 have various functions provided by Windows (registered trademark). Because the functions provided by Windows (registered trademark) are well known in the art, detailed description thereof will be omitted.

The client 1 and the server 2 are connected via a network. The printer 3 is connected to the server 2, and the client 1 can output to the printer 3.

Next, internal configurations of the client 1 and the server 2 will be described. To facilitate understanding of flow of print data, the functions of the client 1 and the server 2 will be described following a print data transfer path.

An application 11 of the client 1 is application-specific software that runs on the client OS, such as wordprocessor software, spreadsheet software, or the like.

When a user designates to print an image on the application 11, the application 11 generates draw commands according to the image and applies the draw commands to graphics device interface (GDI) 15.

Note that an image prepared on the client 1 according to the application 11 is a monochrome image, and the printer 3 is a monochrome printer in this embodiment.

A printer driver 12 is a module that provides special printing functions, such as multipage printing function and overlap printing function. If the user designates a special printing using functions (user interface) provided by a printer driver UI 12a (FIG. 4) when designating to print, then the printer driver 12 generates draw commands corresponding to the designated special printing and applies the draw commands to the GDI 15.

The application 11 and the printer driver 12 send draw commands to the GDI 15 by calling functions (application programming interface (API) functions) for sending commands to the GDI 15.

The GDI 15 is a program module that performs management of a device context (DC), which is a virtual drawing area, and prepares print data by writing data on the DC. The GDI 15 can generate both data in the EMF format and RAW data. Which type of print data is generated is specified from a higher-level module. Higher-level modules are software modules that produce primary print data in a first format using the GDI, modules that create primary print data in the first format by processing print data at the stage before the primary print data, and the like.

Data in the EMF format is data in an intermediate format that can be converted to data dependent of the type of the printer 3 and cannot be sent directly to the printer 3. RAW data is data dependent of the type of the printer 3 and thus can be output directly to the printer 3. RAW data can be compressed more than data in the EMF format.

Figure 2:
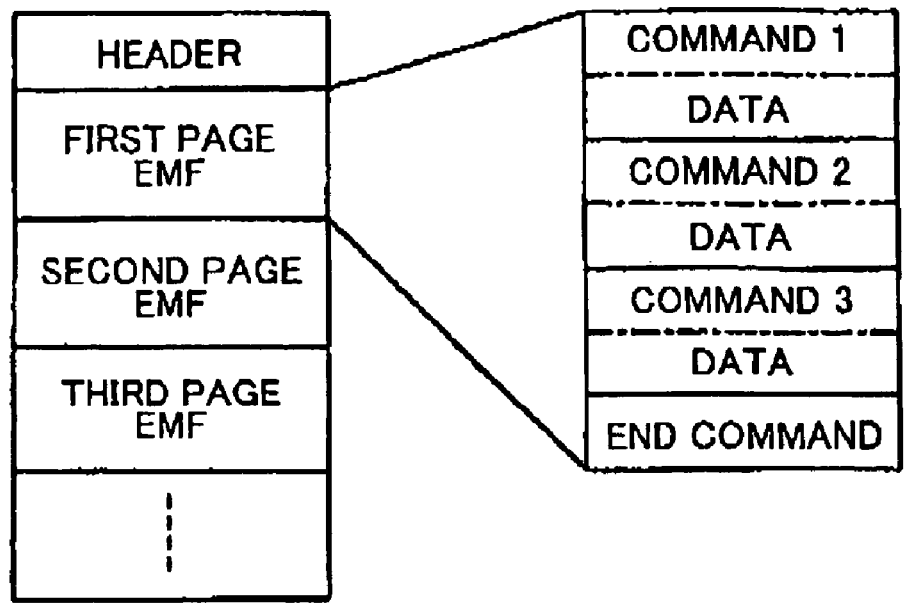
FIG. 2 is an explanatory view of a data structure of a spool file before processing.
Figure 3:
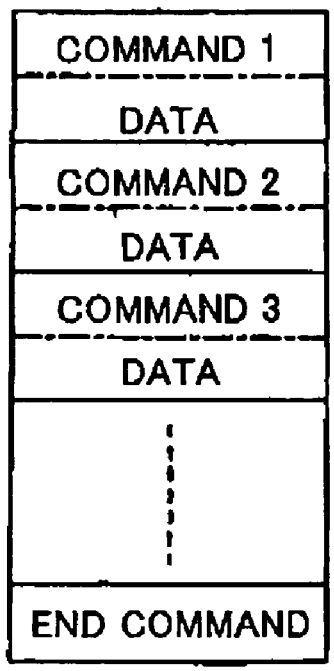
FIG. 3 is an explanatory view of a data structure of EMF.

An EMF represents a single page's worth of image to be printed and includes a command and associated data corresponding to each API that the application 11 called to address the GDI 15 as shown in FIG. 3. For example, when a page is drawn by a line and bitmaps, an EMF for the page contains a command for drawing the line, associated data indicating the start and end points of the line, a command indicating bitmap, associated bitmap data, and data of coordinates of the drawing position. Data in the EMF format is data containing one or more EMFs, each EMF for a single page, as shown in FIG. 2.

Note that among the functions of the GDI 15, the function for performing management of DC and the function for preparing EMFs are provided by the OS, and the function for converting EMFs for a DC into commands dependent on the type of the printer 3 (function for generating RAW data) is provided as a printer driver GDI 12*b* (FIG. 4) provided by a device manufacturer.

The GDI 15 prepares a DC, and application software (higher module) commands the DC to draw an image. Then, the GDI 15 functions in accordance with the command from the application software, thereby preparing print data in the EMF format in this embodiment. In other words, the GDI 15 creates EMFs upon receiving draw commands from the application 11. The EMF created by the GDI 15 are sent to a spooler 16.

That is, the application 11 generates information corresponding to unprocessed image, and the printer driver 12 produces information indicating how to process the unprocessed image. Providing these information to the GDI 15 creates EMFs as primary print data. In other words, the application 11 and the printer driver 12 together function as a primary print data preparation unit 14.

The spooler 16 combines print data (EMFs for a plurality of pages produced by the GDI 15 in page units) and prepares a spool file 18 that includes a data file and a command file. Then, the spool file 18 is stored in the hard disk 17.

The data file has a data structure shown in FIG. 2 and stores the same number of EMFs as pages to print. The command file stores such information as the name of the print job, the name of the printer driver to use, and other basic printer settings. The command file may also store information specifying a process, such as a multipage printing process, an overlap printing process, a page-order exchange printing process, and the like, that the print data processing system of this embodiment executes, and information on settings of the process.

Filenames of the command file and the data file include the same text string indicating a job ID of the print job and an extension indicating whether the particular file is a command file or a data file.

It should be noted that the spool file 18 is not necessarily stored in the client 1, and could be stored to an external storage device connected to the client 1 or any other location, such as a networked drive, provided that the spool file 18 is accessible by the client 1.

In order to perform a special printing, data processor 20 is activated. The data processor 20 processes the EMFs of each print job stored as the spool file 18 for the special printing and applies draw commands corresponding to a processed image to the GDI 15, thereby generating secondary print data.

More specifically, the data processor 20 judges whether or not process information relating to a special printing is stored in a command file of a subject print job. If so, then the data processor 20 generates draw commands corresponding to the processed image, and sends the draw commands to the GDI 15. Also, the data processor 20 checks the filename of the spool file 1B and recognizes the print job, and copies the print job (both the data file and the command file) to a temporary file (not shown) in the hard disk 17 or the like. The temporary file is deleted when the file is no longer needed. Next, the data processor 20 divides the data file of the copied print job by page units based on the end commands. That is, the data processor 20 separates, from one another, the respective EMFs included in the data file.

Further, the data processor 20 has a function for providing the GDI 15 with information identifying a DC to be used, information designating a memory region where a new EMF resulting from setting of print data on the DC is to be stored, and information indicating a region on the DC where an image to be drawn, and also a function for commanding the GDI 15 to project images, i.e., project each EMF copy onto the DC, indicated by the DC identified information, thereby setting print data of each EMF on the DC.

Moreover, the data processor 20 references flags (not shown) stored in a storage area in the printing system 100 to determine whether primary print data should be converted to data in the EMF format or RAW data and selects one of print processors provided to the server 2. In this embodiment, primary print data is converted to RAW data in default setting. Also, if it is determined that primary print data should be converted to the RAW data, then a print processor 36 for RAW data is selected.

When converting primary print data to RAW data, the data processor 20 performs a special printing process on each EMF, thereby generating PDL commands (RAW data). In the example of FIG. 2, an EMS for a first page includes a command 1, data corresponding to the command 1, a command 2, data corresponding to the command 2, a command 3, data corresponding to the command 3, and an end command, and this EMF is converted to PDL command (RAW data).

More specifically, the data processor 20 commands the GDI 15 to perform process on the EMF, and so the GDI 15 retrieves special printing process information from the command file for the subject EMF which was copied by the data processor 20 and analyzes the special printing process information. Then, the GDI 15 converts the EMF to corresponding PDL commands (RAW data) through the printer driver GDI 12*b* (FIG. 4) in the printer driver 12. The converted PDL commands are written to the memory area specified by the data processor 20. At this time, bitmap draw commands are converted to raster commands.

If there is no PDL command corresponding to a command of an EMF, the command is rasterized by the GDI 15 and replaced by a raster command which is one of PDL commands.

On the other hand, when converting primary print data to data in the EMF format, new EMF such as that shown in FIG. 3 is created through the data processor 20. That is, in the example of FIG. 2, an EMF for a first page includes a command 1, data corresponding to the command 1, a command 2, data corresponding to the command 2, a command 3, data corresponding to the command 3, and an end command. The new EMF shown in FIG. 3 is added with commands and corresponding data for achieving the designated special printing, at position between the data corresponding to the command 3 and the end command.

More specifically, the data processor 20 commands the GDI 15 to perform process on the EMF, and so the GDI 15 retrieves process information from the command file for the subject EMF which was copied by the data processor 20 and analyzes the process information. The process information indicates which special printing process should be performed on the subject EMF. Then, the GDI 15 writes control commands and corresponding data required for the special printing to the memory area specified by the data processor 20. In this manner, a new EMF, such as that shown in FIG. 3, is prepared.

After the data processor 20 generates the secondary print data (RAW data in default setting), the secondary print data is returned as a new print job to the spooler 16. The original print job previously stored as the spool file 18 is deleted. The secondary print data processed by the data processor 20 is then sent by the spooler 16 over the network to the server 2.

Figure 4:
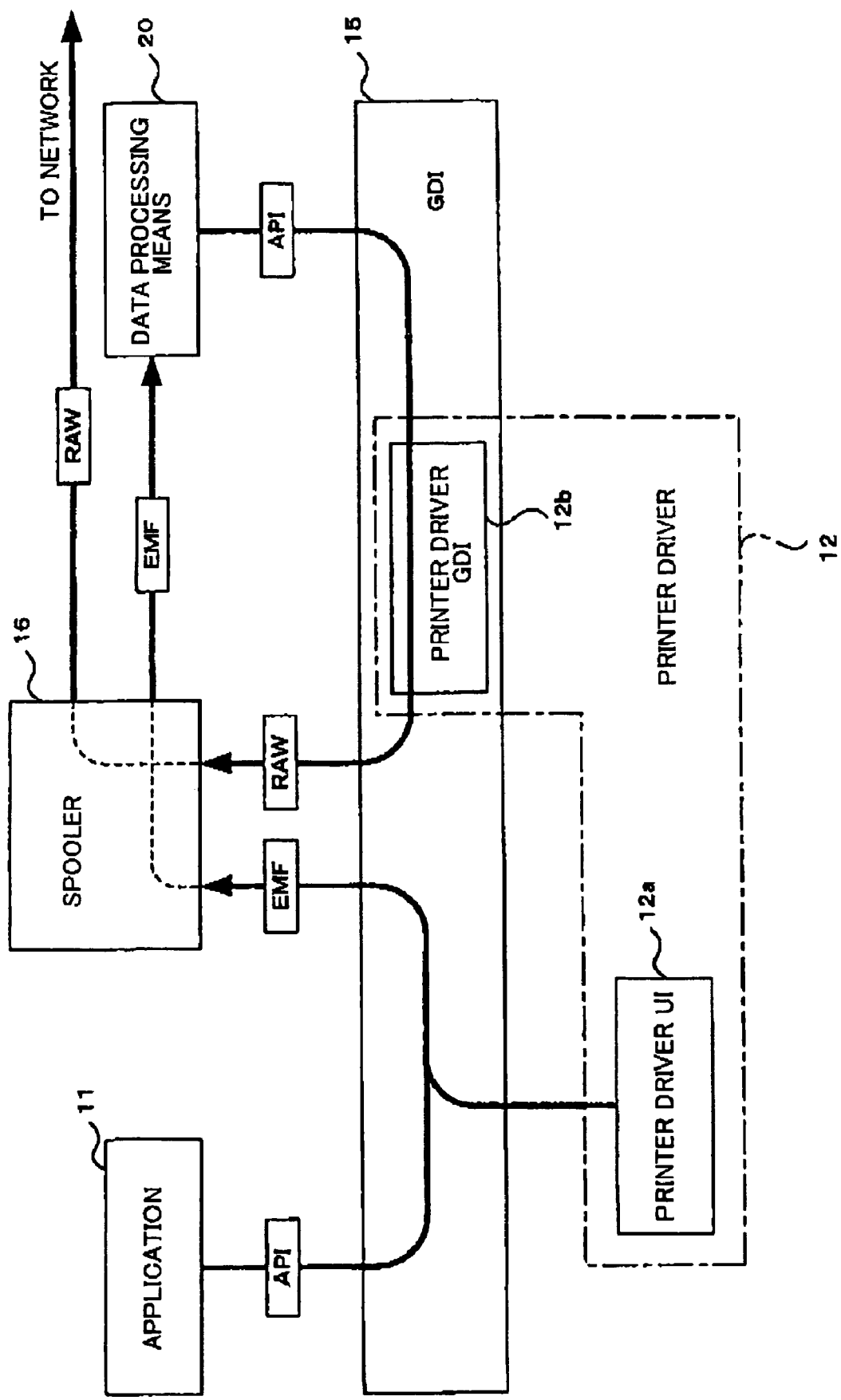
FIG. 4 is an explanatory view of data flow on a client computer.

FIG. 4 summarizes flow of print data on the client 1. The application 11 generates draw commands corresponding to an unprocessed image, and the printer driver 12 generates draw commands corresponding to a special printing process that is performed on the unprocessed image. These draw commands are provided to the GDI 15. The GDI 15 then prepares EMFs as primary print data according to the draw commands, and the spooler 16 combines the EMFs to a single spool file.

The data processor 20 then reads the EMF, interprets the unprocessed image and information on how to process the unprocessed image, generates draw commands corresponding to a processed image, and provides the draw commands to the GDI 15.

Based on the draw commands, the GDI 15 prepares secondary print data, which is RAW data (in default setting), through the function of the printer driver GDI 12b, and the spooler 16 spools the secondary print data. Thereafter, the spooler 16 outputs the secondary print data to the server 2 over the network.

As mentioned previously, an EMF is a standard drawing data structure used in Windows (registered trademark), can be used independently of the type of a printer, and is thus quite versatile. However, this versatility results in an abundance of redundant data.

On the other hand, RAW data is dependent of the type of a printer and includes printer control codes that can only be used by a certain type of printer. Printer control codes differ from maker to maker. Examples of the print control codes include a set of commands in page description language (PDL), such as Hewlett-Packard's PCL language and Adobe's Postscript (registered trademark). RAW data is generated according to the particular specifications of the manufacturer and therefore has less versatility than an EMF. However, because RAW data is mainly formed of control codes addressing the functions of a particular model, there are cases in which RAW data contains less redundant data than an EMF.

For example, if image data in an EMF is sent to the server 2 after converting the image data into PDL, data that is not needed by the printer 3 is eliminated and need not be sent to the server 2.

In other words, by converting primary print data to RAW data as secondary print data before sending the data to the server 2, less data is transferred over the network, thereby reducing the load on the network.

On the server 2, print data sent from the client 1 is processed by a spooler 31.

A spooling system 32 of the spooler 31 temporarily stores the received print data as a spool file 34 on a hard disk 33. If the print data is in the EMF format, then a print processor 35 for EMFs processes the print data. On the other hand, if the print data is RAW data, then the print processor 36 for RAW data processes the print data. It should be noted that the print processor 35 and the print processor 36 are shown side by side in FIG. 1, but this arrangement is for convenience only. The print processor 35 for EMFs is provided by the OS while the print processor 36 for RAW data is provided as a printer driver by a device manufacturer. Also, the print processor 35 for EMFs is a general purpose print processor capable of processing RAW data as well, and is thus not limited to EMF operations. On the other hand, the print processor 36 is for processing only RAW data.

When EMFs requiring further processing for special printing is received by the server 2, a data processing unit (not shown) provided on the server 2 is activated, and the data processing unit processes the EMFs accordingly. The data processing unit on the server 2 has substantially the same functions as the data processor 20 on the client 1 described above. Because the data processing unit on the server 2 is not material feature of the present invention, further description thereof will be omitted.

Secondary print data processed by the print processor 35 or 36 is transmitted from the spooler 31 to a printer driver 38.

If the secondary print data is in the EMF format, then the printer driver 38 converts the secondary print data to printer control codes corresponding to the printer 3 and sends the resulting printer control codes to the printer 3. That is, the printer driver 38 converts EMFs to print data that can be handled by the PDL used in the printer 3 and sends the same to the printer 3. On the other hand, if the secondary print data is RAW data, then the printer driver 38 sends the RAW data to the printer 3 without further processing the RAW data.

Figure 5:
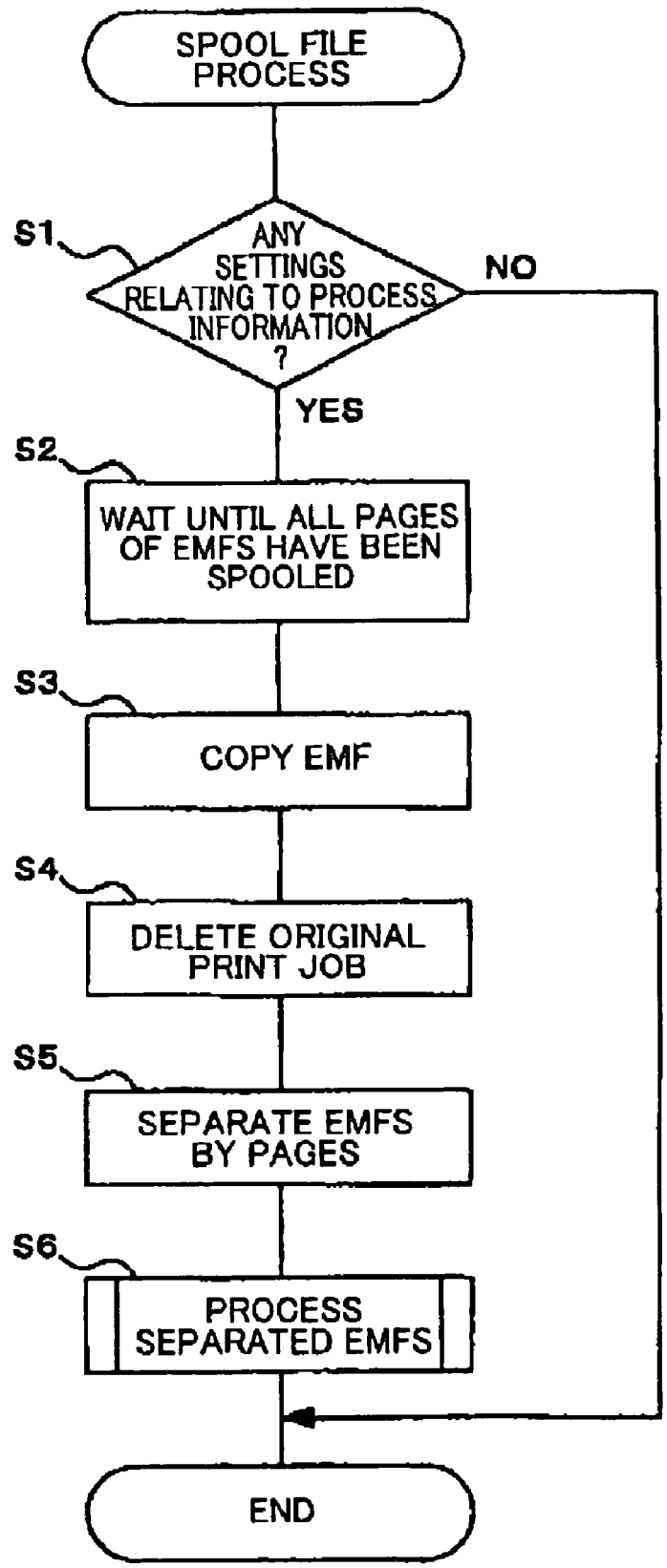
FIG. 5 is a flowchart representing a spool file processing operation according to the embodiment of the present invention.

Next, a spool file process executed by the client 1 (special printing process executed on EMFs) will be described with reference to the flowchart in FIG. 5. In this process, primary print data in the EMF format is selectively converted to secondary print data.

When this process starts, first in S1, it is determined whether or not process information relating to special printing is stored in a command file of a subject print job, which has been created in accordance with draw commands from the primary print data preparation unit 14 and stored in the hard disk 17. This determination is made by the data processor 20 interpreting the command file. If not (S1:NO), this means that it is unnecessary to process EMFs of the subject print job, and the present process ends. On the other hand, if so (S1:YES), then in S2, operation waits until all pages of the subject print job are spooled by the spooler 16. During this time, it is checked whether the data is being spooled.

Next in S3, the data processor 20 copies the subject print job (data file and command file) from the spool file 8 to a temporary file. In S4, the original print job is deleted from the spool file 18.

In S5, a data file of the copied print job is separated into EMFs by the data processor 20. In S6, the EMFs are processed according to the special printing recognized in S1. Then, the current process ends.

Figure 6:
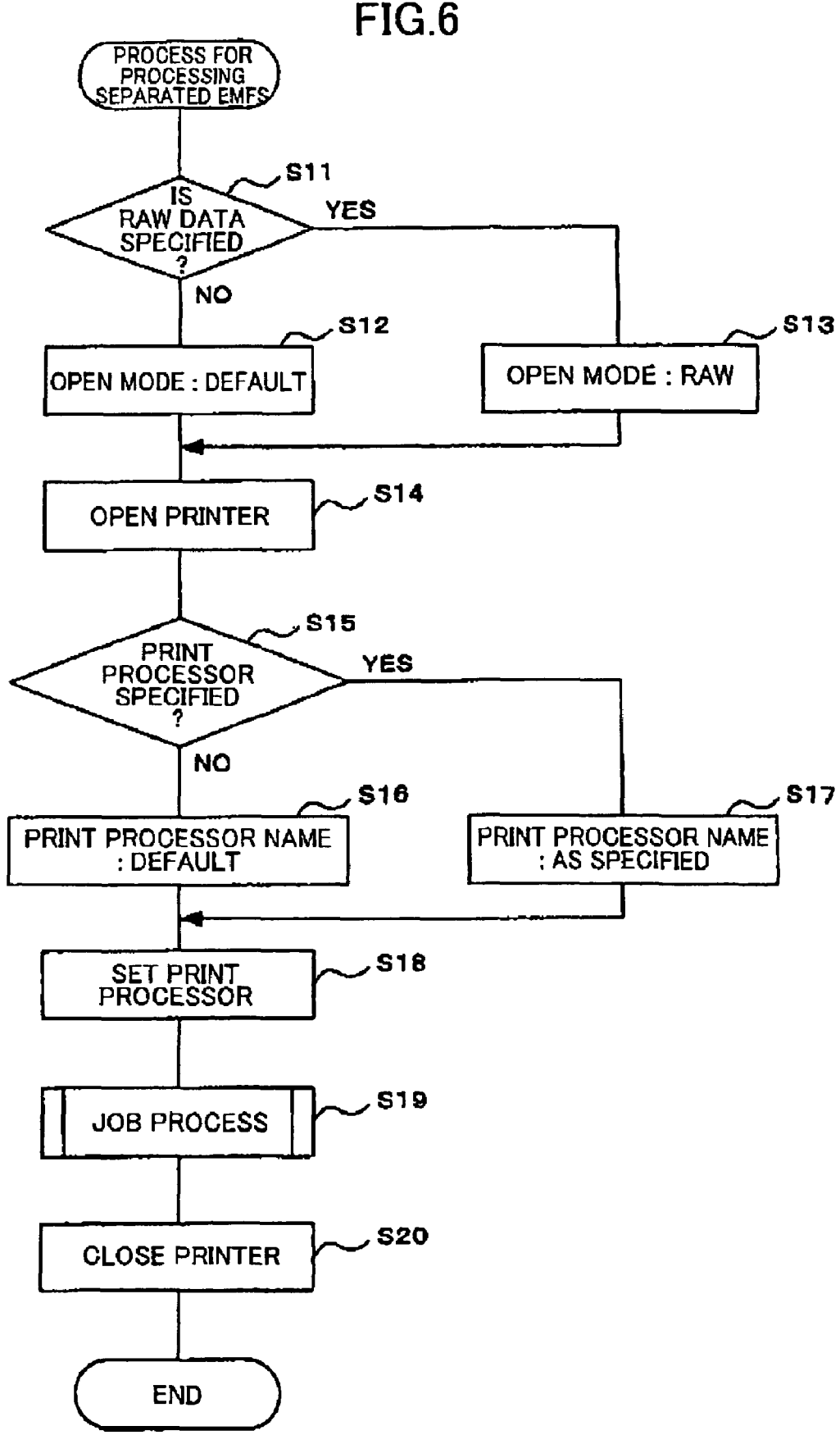
FIG. 6 is a flowchart representing a processing operation according to the embodiment of the present invention.

Next, the process executed in S6 for processing EMFs will be described in detail with reference to the flowchart in FIG. 6.

First in S11, it is determined whether or not RAW data is specified as data type of secondary print data. Information as to whether RAW data is specified or not is stored in a memory region on the client 1 (area called registry in Windows) or a parameter file. In this embodiment, RAW data is specified in default setting, and this setting is changed only when the user specifically changes the setting.

If S11 results in a negative determination (S11:NO), then in S12, a default mode is selected as an open mode in which the printer 3 is opened. On the other hand, if S11 results in a positive determination (S11:YES), then in S13, a RAW mode is selected as the open mode. The default mode is a mode designated by the OS, and the EMF mode is normally set to the default mode.

Then in S14, the printer 3 is opened in the selected open mode. Because the printer driver 12 needed to printout to the opened printer 3 is stored in the command file, the printer 3 corresponding to the printer driver 12 specified by the command file is opened. At this time, whether the print data is output to the printer 3 in the EMF format or as RAW data is thus determined.

Next in S15, it is determined whether a print processor to be used on the server 2 side has been specified or not. Information indicating as to whether a particular print processor is specified or not is stored in a memory or a parameter file on the client 1 similarly to the above-mentioned information as to whether RAW data is specified. In this embodiment, the print processor 36 for RAW is normally specified. This setting is only changed when intentionally changed by the user.

If it is determined in S15 that a print processor is not specified (S15:NO), then in S16, the name of a default print processor is selected. On the other hand, if it is determined that a print processor is specified (S15:YES), then in S17, the name of the print processor 36 is selected.

In S18, the name of the print processor selected in either S16 or S17 is set as a print processor to be used on the server 2. At this time, one of the print processor 35 and the print processor 36 is selected.

In S19, a job process is executed to print. In S20, the printer 3 is closed. Then, this process ends.

That is, if EMF is specified as a data format for secondary print data when opening the printer 3, then the GDI 15 prepares secondary print data in the EMF format without using the printer driver GDI 12b. On the other hand, if RAW data is specified as a data format for the secondary print data when opening the printer 3, then the GDI 15 prepares RAW data as secondary print data through the printer driver GDI 12b. After the printer 3 was opened, providing the printer with data converts the data to either EMFs or RAW data.

Next, the job process executed in S19 will be described in detail. The job process differs according to the special printing. Job processes for certain special printing will be described below.

Figure 7:
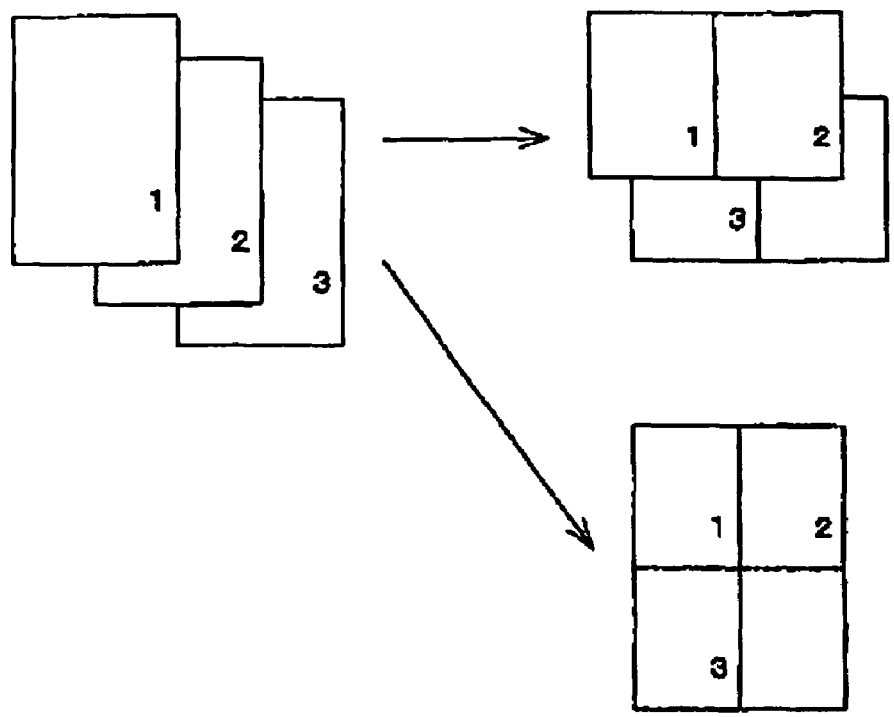
FIG. 7 is an explanatory view of layout in multipage printing.

First, a job process for multipage printing will be described with reference to the flowchart of FIG. 8. Multipage printing is for printing a plurality of successive pages on the same sheet as shown in FIG. 7 and is thus referred to as N-in-1 printing, such as 4-in-1 or 2-in-1 printing.

Figure 8:
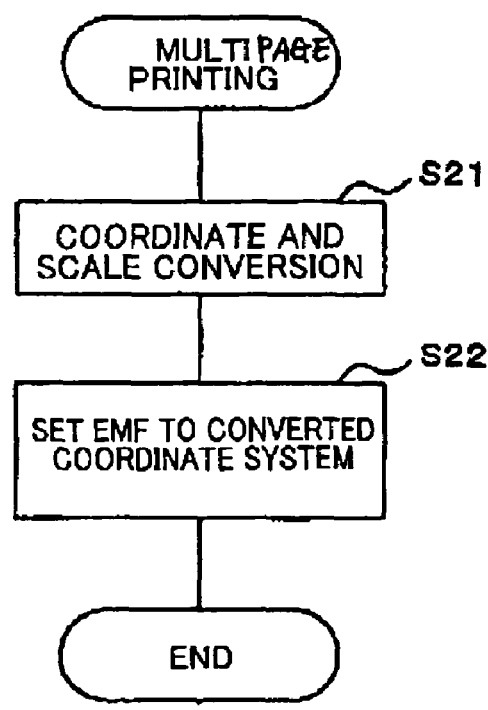
FIG. 8 is a flowchart representing a multipage printing process according to the embodiment of the present invention.

As shown in FIG. 8, first in S21, a coordinate and scale conversion processes are executed on the DC as required for the N-in-1 printing. Next in S22, an EMF for each page is projected onto the DC at the converted coordinate system. That is, print data of EMF for each page is set on the DC according to the converted coordinate system. Then, the process ends.

Processes executed in S21 and S22 will be described below in greater detail for the 4-in-1 printing and 2-in-1 printing as examples.

Figure 9:
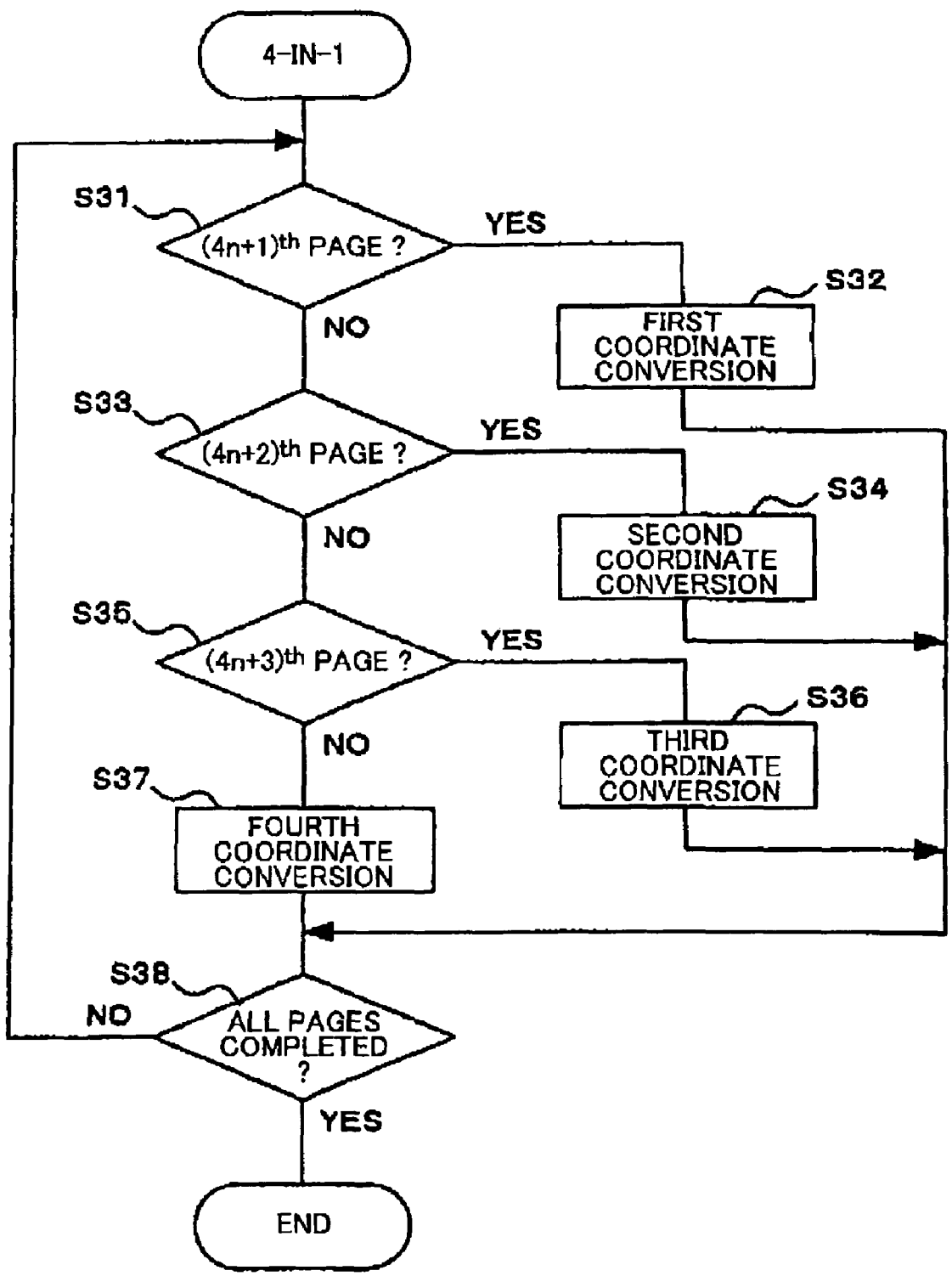
FIG. 9 is a flowchart representing a 4-in-1 printing process according to the embodiment of the present invention.

First, the processes for the 4-in-1 printing will be described with reference to the flowchart of FIG. 9. In this process, first in S31, it is determined whether or not an EMF subjected to be processed is for $(4n+1)^{th}$ page. If so (S31:YES), then in S32, a first coordinate conversion is preformed to set print data of the EMF for the $(4n+1)^{th}$ page to the upper left portion of an $m^{th}$ page. The coordinate conversion in S32 is performed based on the formulas:

$$X'=aX+bY+c$$

$$Y'=dX+eY+f$$

wherein coefficients "a", "b", "d", and "e" define rotation and scale conversion, and coefficients "c" and "f" define parallel movement. This coordinate conversion is executed by calling the appropriate function (API) asserting the coordinate conversion command to the GDI 15.

On the other hand, if S31 results in a negative determination (S31:NO), then in S33, it is determined whether or not the present EMF is for a $(4n+2)^{th}$ page. If so (S33:YES), then in S34, a second coordinate conversion is performed to set print data of the EMF for the $(4n+2)^{th}$ page to the upper right portion of the $m^{th}$ page. If not (S33:NO), then in S35, it is determined whether or not the present EMF is for a $(4n+3)^{th}$ page. If so (S35:YES), then in S36, a third coordinate conversion is performed to set print data of the EMF for the $(4n+3)^{th}$ page to the lower left portion of the $m^{th}$ page.

If S35 results in a negative determination (S35:NO), then in S37, a fourth coordinate conversion is performed to set print data of the EMF for the $(4n+4)^{th}$ page to the lower right portion of the $m^{th}$ page. In S38, it is determined whether or not coordinate conversion has been completed for all pages. If not (S38:NO), then the process returns to S31. If so (S38:YES), then the present process ends.

Figure 10:
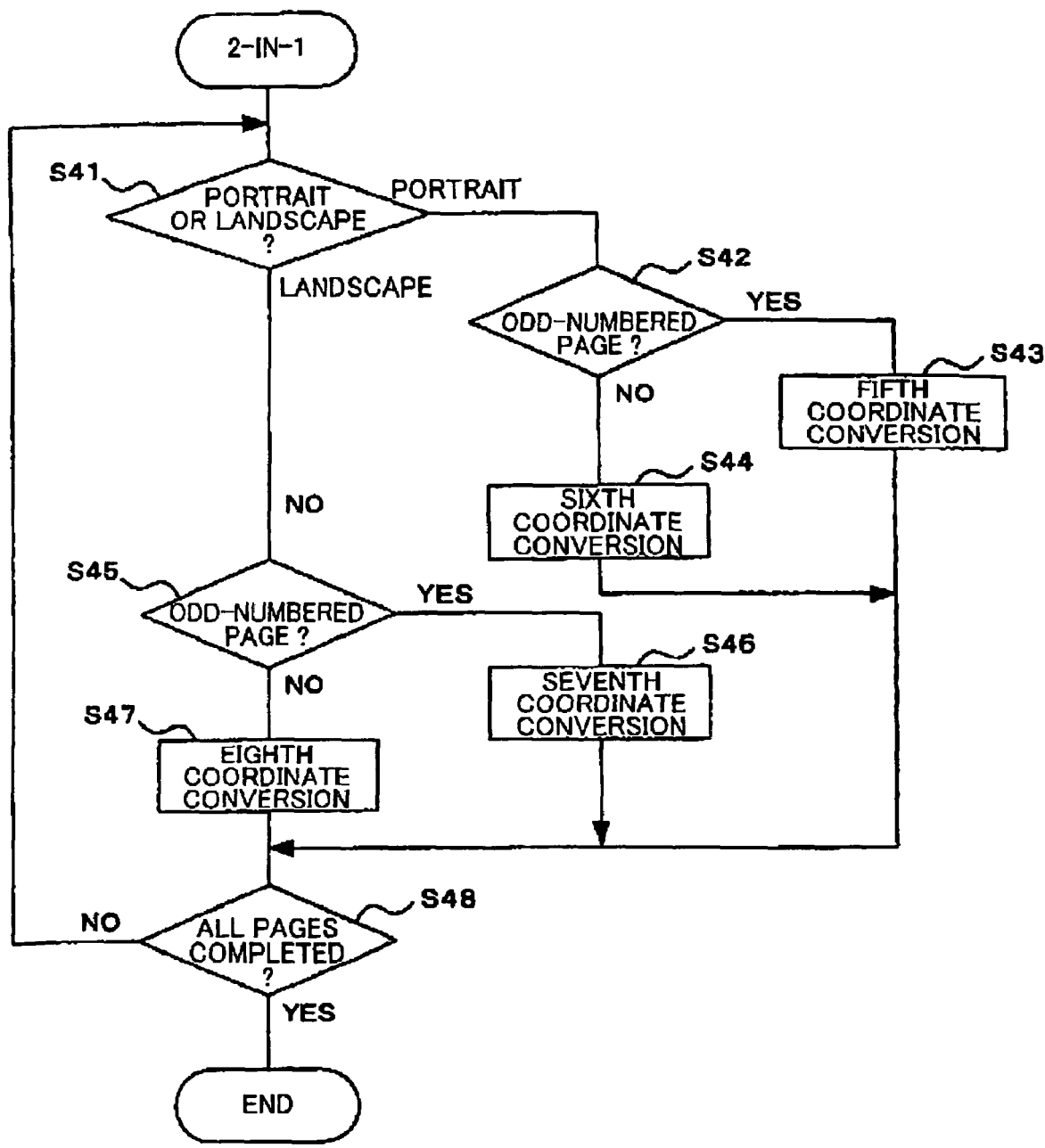
FIG. 10 is a flowchart representing a 2-in-1 printing process according to the embodiment of the present invention.

Next, processes for 2-in-1 printing will be described with reference to the flowchart in FIG. 10.

In this process, first in S41, it is determined whether the page will be printed in portrait mode or landscape mode. In the portrait mode, the paper is used with the shorter side at the top, and in the landscape mode, the paper is used with the longest side in the horizontal direction. If the page will be printed in the portrait mode, then it is determined in S42 whether or not the present EMF is for an odd numbered page. If so (S42:YES), then in S43, a fifth coordinate conversion is performed to set print data of the EMF for the odd numbered page to the upper half portion of the page. Then, the process proceeds to S48. On the other hand, if not (S42:NO), this means that the present EMF is for an even numbered page. Then, a sixth coordinate conversion is performed in S44 to set print data of the EMF for the even numbered page to the lower half of the page. Then, the process proceeds to S48.

If it is determined in S41 that the page will be printed in the landscape mode, then in S45, it is determined whether or not the present EMF is for an odd numbered page. If so (S45:YES), then a seventh coordinate conversion is performed in S46 to set print data of the EMF for the odd numbered page to the left half of the page. Then, the process proceeds to S48. On the other hand, if not (S45:NO), then an eights coordinate conversion is performed in S47 to set print data of the EMF for the even numbered page to the right half of the page. Then, the process proceeds to S48.

In S48, it is determined whether or not coordinate conversion has been completed for all pages. If not (S48:NO), then the process returns to S41. On the other hand, if so (S48:YES), then the process ends.

In this process, data for a plurality of pages in the primary print data is converted to data for a single sheet in multipage printing, and thus converted data is transmitted over the network. Therefore, the amount of data transmitted over the network can be reduced.

Figure 11:
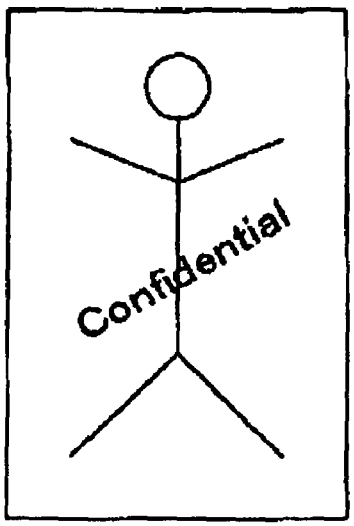
FIG. 11 is an explanatory view of layout in overlap printing.
Figure 12:
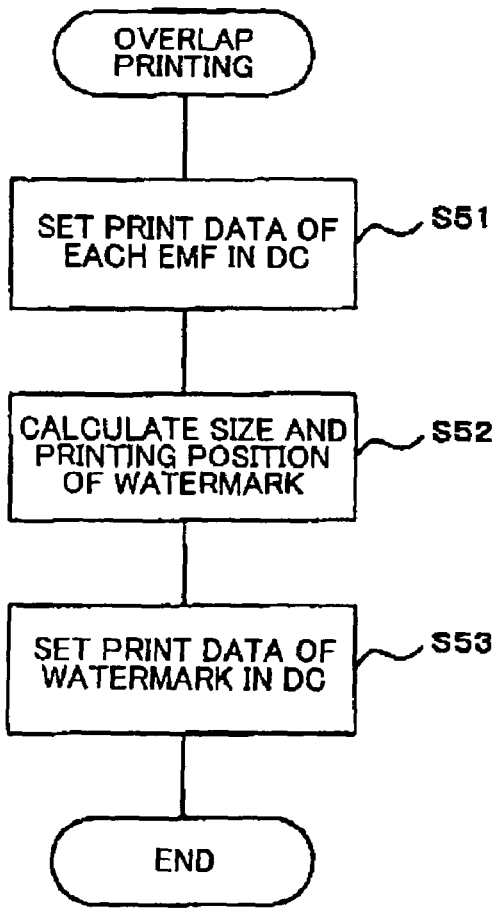
FIG. 12 is a flowchart representing an overlap printing process according an embodiment of the present invention.

Next, a job process for overlap printing will be described with reference to the flowchart of FIG. 12. It should be noted that overlap printing is to print a transparent image over an original image. For example, as shown in FIG. 11, a transparent image "Confidential" is printed over an original image so that the original image can be seen through the transparent image.

As described above, in S5 of FIG. 5, the copied data file is separated into EMFs. In the process of FIG. 12, first in S51, print data of an EMF for a subject page is set in a specific DC. Next, in S52, the size and printing position of a transparent image are calculated based on the size of a recording sheet, the number of letters in the transparent image, and the printing angle of the transparent image with respect to the recording sheet. In S53, print data of the transparent image which has been calculated in S52 is set to in overlapping form on the DC where the print data of the EMF has already been set in S51, thereby instructing the GDI 15 through the API to perform drawing. Then, the process ends.

In this case, print data for multiple layers in the primary print data is combined, and the combined print data is sent to the server, thereby reducing the amount of data transmitted over the network.

It should be noted that the processes in S51 to 553 could be performed in an opposite order, that is, in the order of S53, S52, and S51. In this case, the transparent image will be printed first and then the original image be printed on top of the transparent image.

Figure 13:
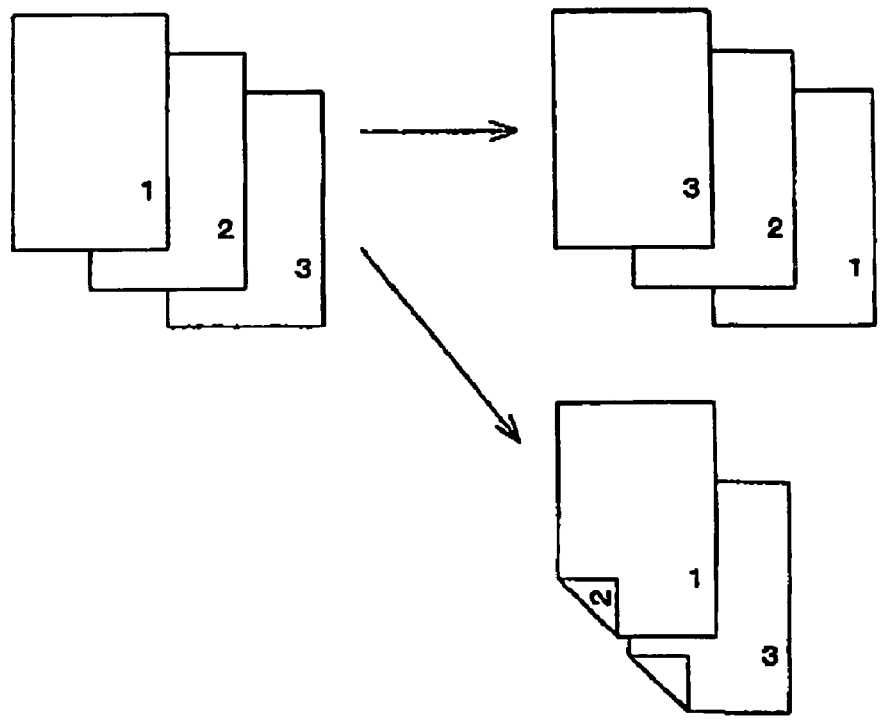
FIG. 13 is an explanatory view of layout in page-order exchange printing.
Figure 14:
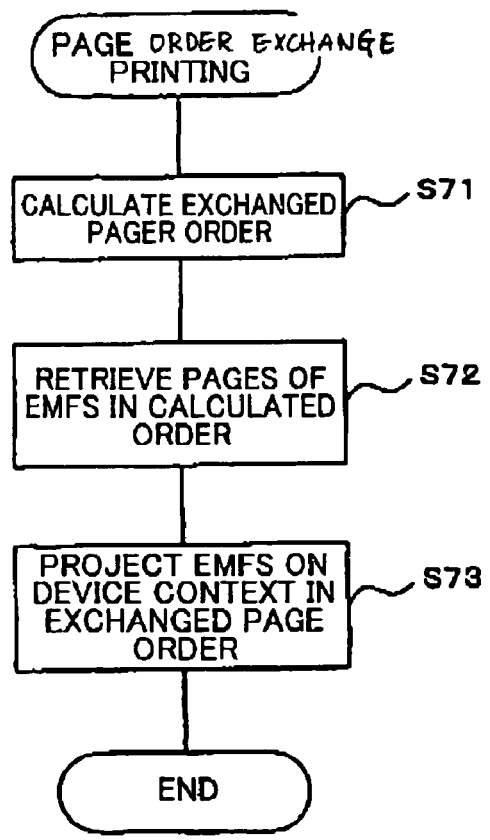
FIG. 14 is a flowchart representing a page-order exchange printing process according to the embodiment of the present invention.

Next, a job process for page-order exchange printing will be described with reference to the flowchart of FIG. 14. The page-order exchange printing is for change the order of printing a plurality of pages as shown in FIG. 13. For example, in order to perform face-up printing, the order of printing the plurality of pages is reversed so that the plurality of pages will be printed from the last page up to the first page. In order to perform duplex printing, the order of printing the plurality of pages is adjusted so that different pages will be printed on both sides of each sheet.

As described above, in S5 of FIG. 5, the copied data file is separated into EMFs. In the process of FIG. 14, first in S71, the order of printing pages is calculated. Specifically, for the face up printing, the order of printing page is calculated as an inverse order. That is, the order of printing is calculated so that the pages will be printed in the order of "n", "n–1", "n–2", . . . "2", and "1". For the duplex printing, the order of printing pages is calculated so that all the odd number pages will be printed first in a normal order, and then all the even number pages will be printed in an inverse order.

Next, in S72, the EMFs for all the pages of the print job are retrieved in the order calculated in S71.

Note that when a manual duplex printing is performed, all the odd number pages will be printed first on separate sheets. Then, the user turns over the printed sheets, and reinserts the sheets into the printer. Then, the even umber pages will be printed on the unprinted sides of the sheets. For this reason, it is preferable that the single print job for the manual duplex printing operation be separated into a first print job for odd numbered pages and a second print job for even numbered pages, so that the user can perform manual operation to turn over the sheets and return them to the printer between the first and second print jobs.

Next, in S73, the retrieved EMFs are projected on the DC in the order changed in S71. Then, the present process ends.

Note that the print data created by the job process in S19 is either in the EMF format or RAW data in accordance with the open mode specified in S14.

As described above, according to the print data processing system provided to the client 1, the client 1 sends RAW data (secondary print data) created by the data processor 20 over the network to the server 2. Sending RAW data to the server 2 reduces the amount of data sent over the network compared with sending data in the EMF format (primary print data) directly to the server 2. Therefore, according to the print data processing system of the present embodiment, the amount of print data sent from the client 1 to the server 2 is reduced, thereby reducing the load on the network.

Also, the print data processing system of the present embodiment can specify one of the print processors provided to the server 2 as a print processor for RAW data. Therefore, the print processor 36 suited to printing the RAW data can be used.

That is, it is possible for the server 2 to select and use one of print processors provided to the server 2. However, there is no assurance that the print processor selected by the server 2 matches the secondary print data sent from the client 1. The configuration according to the present embodiment, however, can specify a print processor most suited for the secondary print data sent from the client 1.

Further, according to the present embodiment, a user can select EMF or RAW data to send to the server 2, and EMF data can be sent to the server 2 if desired.

While some exemplary embodiments of this invention have been described in detail, those skilled in the art will recognize that there are many possible modifications and variations which may be made in these exemplary embodiments while yet retaining many of the novel features and advantages of the invention.

For example, in the above-described embodiment, print data output from the application 11 was monochrome data. However, the data could be color print data. In this case, if the printer 3 is a monochrome printer, data for implementing color print contained in an EMF is unnecessary. Therefore, by converting the data to RAW data for monochrome printing, the amount of data transmitted over the network can be reduced.

Also, in the above-described embodiment, data in the EMF format was described as an example of primary print data in an intermediate format. However, the primary print data can be in different format.

Further, RAW data was described as an example of secondary print data that is dependent of the type of printer and that can be compressed more than the primary print data. However, insofar as the format is printer-dependent and can be compressed more than the primary print data format, other data formats could be used instead. For example, if the printer 3 has a function for decoding data which has been compressed using a specific encoding scheme, then primary print data could be converted to secondary print data using the specific encoding scheme rather than using a PDL.

Note that compression includes all methods that can be used to reduce the data size. More specifically, compression includes both reversible and irreversible compression methods. Irreversible compression methods include techniques that simply delete all or part of unnecessary data.

What is claimed is:

1. A print data processing system installed in a client device of a printing system, the printing system transmitting print data from the client device to a server over a network, the server being connected to an image forming device, the print data processing system comprising:

a GDI that generates a print data according to a draw command in selected one of a first format and a second format, the print data in the first format being intermediate data convertible to data dependent of the image forming device, the print data in the second format being dependent of the image forming device and being compressed more than the print data in the first format, wherein the GDI selectively generates primary print data in the first format that includes image data and process information indicating how to process the image data;

a spooler that stores the print data generated by the GDI as a spool file and that is capable of sending the print data stored as the spool file to the server over the network; and a data processor that generates the draw command corresponding to a processed image based on the image data and the process information included in the primary print data in the first format and for applying the draw command to the GDI, wherein the GDI generates secondary print data in the second format that includes information corresponding to the processed image upon applied with the draw command, wherein:

the GDI generates the primary print data in the first format in accordance with a command from a higher module;

the spooler stores the primary print data in the first format as a spool file;

the data processor generates the draw command corresponding to the processed image based on the primary print data in the first format and applies the draw command to the GDI;

the GDI generates the secondary print data in the second format in accordance with the draw command; and the spooler stores the secondary print data in the second format as a spool file and transmits the secondary print data in the second format from the client device to the server over the network.

2. The print data processing system according to claim 1, wherein when the data processor generates the draw command based on the primary print data that includes the primary image data in a bitmap format and applies the draw command to the GDI, the GDI converts the primary image data to the secondary image data whose data amount has been compressed by writing the primary image data in a page description language, thereby generating the secondary print data including the secondary image data.

3. The print data processing system according to claim 1, wherein when the data processor generates the draw command based on the primary print data including color print data and applies the draw command to the GDI, the GDI converts the color print data to monochrome print data whose data amount has been compressed, thereby generating the secondary print data including the monochrome print data.

4. The print data processing system according to claim 1, wherein when the data processor generates the draw command based on the primary print data including page print data that is for printing a plurality of pages on respective recording sheets and applies the draw command to the GDI, the GDI converts the page print data to multipage print data for printing the plurality of pages in a single recording sheet, thereby generating the secondary print data including the multipage print data.

5. The print data processing system according to claim 1, wherein when the data processor generates the draw command based on the primary print data that includes overlap print data for a plurality of layers and applies the draw command to the GDI, the GDI converts the overlap print data to overlapped print data by overlapping the plurality of layers, thereby generating the secondary print data including the overlapped print data.

6. The print data processing system according to claim 1, wherein the data processor specifies one of a plurality of printing processors provided to the server as a printing processor that is used when printing the secondary print data.

7. The print data processing system according to claim 1, wherein the data processor switches, based on an instruction from a user, between a first setting and a second setting, wherein:

the GDI selectively generates the secondary print data in the first format;

in the first setting, the GDI generates the secondary print data in the first format, and the secondary print data in the first format is sent to the server;

in the second setting, the GDI generates the secondary print data in the second format, and the secondary print data in the second format is sent to the server; and the data processor switches between the first setting and the second setting when the spooler stores the primary print data in the first format as the spool file.

* * * * *